(12) United States Patent
Karabel et al.

(10) Patent No.: US 12,305,763 B2
(45) Date of Patent: May 20, 2025

(54) PISTON RING WITH VARIABLE PRESSURE RELIEF

(71) Applicant: Federal-Mogul Burscheid GmbH, Burscheid (DE)

(72) Inventors: Döndü Karabel, Burscheid (DE); Jörn Pröpper, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 18/558,597

(22) PCT Filed: Mar. 14, 2022

(86) PCT No.: PCT/EP2022/056502
§ 371 (c)(1),
(2) Date: Nov. 2, 2023

(87) PCT Pub. No.: WO2022/233481
PCT Pub. Date: Nov. 10, 2022

(65) Prior Publication Data
US 2024/0229933 A1    Jul. 11, 2024

(30) Foreign Application Priority Data
May 4, 2021 (DE) .................. 10 2021 111 437.3

(51) Int. Cl.
*F16J 9/20*    (2006.01)

(52) U.S. Cl.
CPC ........................ *F16J 9/20* (2013.01)

(58) Field of Classification Search
CPC . F16J 9/00; F16J 9/14; F16J 9/20; F02F 5/00
See application file for complete search history.

(56) References Cited

U.S. PATENT DOCUMENTS

| | | | |
|---|---|---|---|
| 2002/0033579 A1* | 3/2002 | Ishida | F16J 9/203 277/434 |
| 2015/0292620 A1* | 10/2015 | Mittler | F16J 9/20 277/434 |

FOREIGN PATENT DOCUMENTS

| | | |
|---|---|---|
| EP | 2206909 A1 | 7/2010 |
| EP | 3546805 A1 | 10/2019 |
| EP | 3421846 B1 | 11/2020 |
| JP | H0254351 U | 4/1990 |

* cited by examiner

*Primary Examiner* — Grant Moubry
(74) *Attorney, Agent, or Firm* — Dickinson Wright PLLC

(57) ABSTRACT

A piston ring includes a ring outer side, an upper ring flank and a lower ring flank, whereby the ring outer side has a pressure relief chamfer at an upper edge, so that only a lower part of the ring outer side forms a contact surface. An axial dimension of the contact surface varies in the circumferential direction.

17 Claims, 1 Drawing Sheet

PISTON RING WITH VARIABLE PRESSURE RELIEF

BACKGROUND

1. Technical Field

The present invention relates to a piston ring having a pressure relief chamfer formed on the ring outer side.

2. Related Art

Radial pressures of piston rings, which act between the running surfaces of cylinder and ring and which are intensified by the combustion pressure, do not act evenly over the circumference of the sealing system. Due to the heat expansion differences between ring inner surface and ring outer surface, radial pressures are higher at the ring end gap, whereby a higher surface pressure is created in this region and reduced oil film thicknesses are effected. In addition, the oil pressures in the vicinity of the ring end gap drop to surrounding area level due to the interruption of the running surface, and a circumferential lubricating oil flow into the ring end gap recess results. This leads to further oil film reductions, finally to significant solid body contact or friction, respectively, and increased wear, fretting and reinforcement layer disintegration resulting therefrom with crack and cobblestone formation on the running surface, in particular in the joint regions of the piston ring.

Ground bevels at the running surface above the pivot point are known corrective measures, preferably in the case of piston rings with larger axial heights. They serve as gas pressure contact surface and create a force component in the direction of the piston groove inner region. This force component thus radially counteracts the gas pressure at the inner diameter of the ring and thus relieves the bearing region of the running profile, in order to avoid tribological damages to the usually available reinforcement layers in particular to rings of the first piston ring groove, which are directly subjected to the combustion pressure. These known pressure reliefs, however, are attached evenly over the entire circumference and thus have the effect of acting evenly on the cylinder wall against the radial pressure of the ring.

It is the object to consider the circumferential variability of the radial pressures and to provide a solution that compensates for such variability.

SUMMARY

According to a first aspect, a piston ring comprises a ring outer side, an upper ring flank and a lower ring flank, whereby the ring outer side has a pressure relief chamfer at an upper edge, so that only a lower part of the ring outer side forms a contact surface, characterized in that an axial dimension of the contact surface varies in the circumferential direction.

The advantage of the piston ring according to the first aspect is that a systematically defined axial dimension of the contact surface over the circumference of the ring compensates for the circumferentially different radial pressures or effective radial pressures, respectively. This takes place by means of the associated change of the height of the gas contact surface on the running surface, which counteracts the gas pressure at the ring inner diameter in that direction.

It is preferred that the axial dimension of the contact surface includes a radially outermost point or pivot point, respectively, of the contact surface.

It is preferred that the axial dimension of the contact surface extends all the way to the radially outermost point of the running surface.

It is preferred that an axial position of the radially outermost point of the contact surface varies in the circumferential direction.

It is preferred that an axial distance between the upper edge and the contact surface is maximal in the region of the joint and tapers at an even progression over the circumference to a minimum value, which lies in the range from 0% to 40%, preferably from 2.5% to 30%, particularly preferably from 5% to 15% of a piston ring height.

It is preferred that the axial dimension of the contact surface has a minimum in a region, which extends over 5% to 35%, preferably 10% to 30%, particularly preferably 10% to 25% of the total circumference of the piston ring on both sides of the ring end gap.

It is preferred that the axial dimension of the contact surface increases in the circumferential direction from the minimum to the ring end gap and in the opposite direction.

It is preferred that the axial dimension of the contact surface has the minimum at the ring end gap.

It is preferred that the axial dimension of the contact surface increases in the circumferential direction starting at the ring end gap.

It is preferred that the axial dimension of the contact surface is constant on both sides of the ring end gap over the region, which extends over 5% to 35%, preferably 10% to 30%, particularly preferably 10% to 25% of the total circumference of the piston ring on both sides of the ring end gap.

It is preferred that the axial dimension of the contact surface is constant at first and then increases on both sides of the ring end gap over the region, which extends over 5% to 35%, preferably 10% to 30%, particularly preferably 10% to 25% of the total circumference of the piston ring.

It is preferred that the axial dimension of the contact surface is constant in at least one region in the circumferential direction.

It is preferred that the axial dimension of the contact surface in subregions of the circumference is between 60% and 100% of the piston ring height.

It is preferred that the axial dimension of the contact surface in a region located opposite the ring end gap is 60% of the piston ring height.

It is preferred that an angle between the pressure relief chamfer and the upper edge lies in the range from 93° to 160°, preferably in the range from 100° to 150°, particularly preferably in the range from 105° to 140°.

THE DRAWINGS

Exemplary embodiments of the invention will be described in more detail below with reference to the figures, in which.

DETAILED DESCRIPTION

Figure 1:
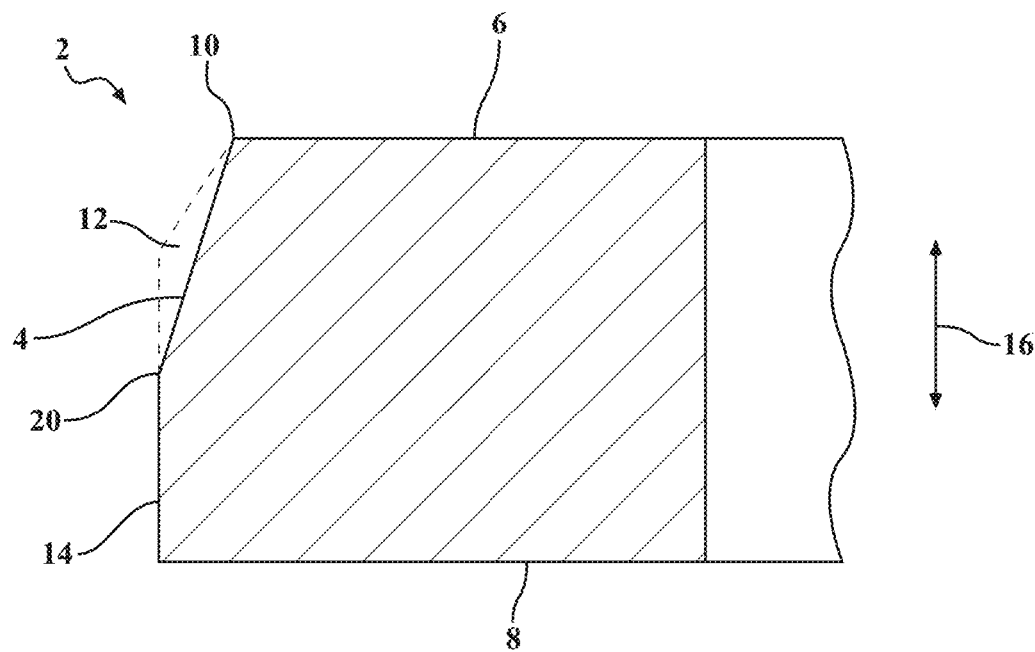
FIG. 1 shows a cross section of a piston ring.

FIG. 1 shows a cross section of a piston ring 2 comprising a ring outer side 4, an upper ring flank 6 facing a combustion chamber, and a lower ring flank 8 facing away from a combustion chamber. A pressure relief chamfer 12, which has an axial dimension in the axial direction 16 and which, starting at an upper edge 10, reaches up to approximately 35% to 45% of the axial piston ring height, can be seen on the ring outer side 4. A radial dimension of the pressure relief chamfer 12 is approximately 10% to 15% of the radial dimension of the piston ring cross section. A linear connection of the end of the contact surface 14, which lies closest to the upper edge 10, thereby forms the pressure relief chamfer 12 with a point on the upper edge 10, which is offset inwards in the radial direction. Combustion gases can push through the pressure relief chamfer 12 against the piston ring 2 from the outside and can exert a force in this way, which counteracts a force, which is generated by combustion gases, which act on a piston ring inner side. A contact surface 14 or running surface, respectively, with a radially outermost point 20 is located in the lower region of the ring outer side 4.

The pressure relief chamfer 12 is defined by an angle between the pressure relief chamfer 12 and the upper edge 10. The minimal angle, which is preferably located at the ring end gap 12, is approximately 93° to 110°. The maximum angle is approximately 135° to 140°, whereby the latter lies between the dashed line, which indicates the variation of the pressure relief chamfer 12 in the circumferential direction 18, and the upper edge 10 in FIG. 1.

Figure 2:
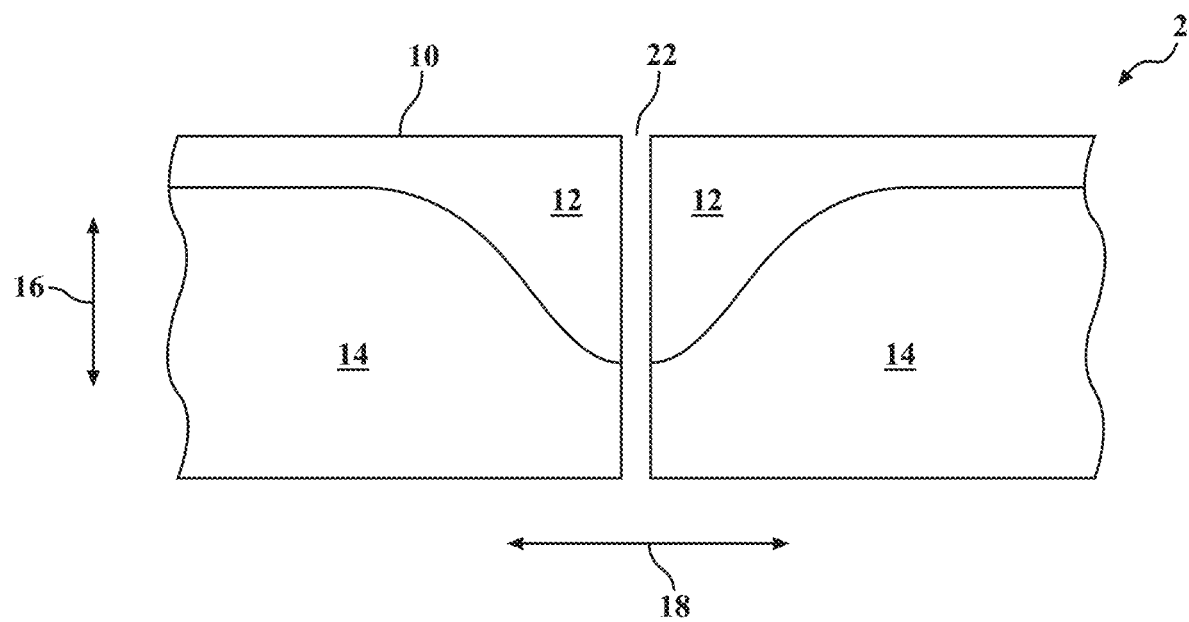
FIG. 2 shows a top view onto the ring outer side in the joint region of the piston ring.

FIG. 2 shows a top view onto the ring outer side of the piston ring 2 in the region of the ring end gap 22. As in FIG. 1, the pressure relief chamfer 12 faces the combustion chamber and the contact surface 14 faces away from the combustion chamber. An axial dimension of the pressure relief chamfer 12 or contact surface 14, respectively, thereby varies in the circumferential direction 18. At the ring end gap 22, the axial dimension in the axial direction 16 of the contact surface 14 has a minimum and is approximately 55% to 65% of the axial piston ring height. In the region of the ring end gap 22, the axial dimension of the contact surface 14 is preferably minimal because the oil pressure drop is most serious there due to the interruption of the contact surface 14. In the circumferential direction 18, the axial dimension of the contact surface 14 then widens steadily, until it is approximately 80% to 85% of the axial piston ring height, whereby the transitions are rounded. The axial dimension of the contact surface 14 is constant in the further visible circumferential progression. The embodiment of the pressure relief chamfer 12 or contact surface 14, respectively, is thereby symmetrical to the ring end gap 22.

The invention claimed is:

1. A piston ring, comprising:
   a ring outer side, an upper ring flank and a lower ring flank,
   wherein the ring outer side has a pressure relief chamfer at an upper edge, so that only a lower part of the ring outer side has a contact surface, which forms a running surface,
   wherein an axial dimension of the contact surface varies in a circumferential direction, and the axial dimension of the contact surface has a minimum axial dimension at a ring end gap, and
   wherein an axial distance between the upper edge and the contact surface is at a maximum value in a region of the ring end gap and tapers at an even progression over a circumference to a minimum value, wherein the minimum value lies in the range from 2.5% to 40% of a piston ring height, and wherein the axial dimension of the contact surface in subregions of the circumference is more than 60% and less than 100% of the piston ring height.

2. The piston ring according to claim 1, wherein the axial dimension of the contact surface includes a radially outermost point of the running surface.

3. The piston ring according to claim 2, wherein the axial dimension of the contact surface extends all the way to the radially outermost point of the running surface.

4. The piston ring according to claim 2, wherein an axial position of the radially outermost point of the contact surface varies in the circumferential direction.

5. The piston ring according to claim 1, wherein the minimum value lies in the range from 2.5% to 30% of the piston ring height.

6. The piston ring according to claim 1, wherein the minimum axial dimension extends in a region over 5% to 35% of a total circumference of the piston ring on both sides of the ring end gap.

7. The piston ring according to claim 6, wherein the axial dimension of the contact surface increases in the circumferential direction from the minimum axial dimension to the ring end gap.

8. The piston ring according to claim 1, wherein the axial dimension of the contact surface increases in the circumferential direction starting at the ring end gap.

9. The piston ring according to claim 1, wherein a minimal axial dimension of the contact surface is constant on both sides of the ring end gap over a region which extends over 5% to 35% of a total circumference of the piston ring on both sides of the ring end gap.

10. The piston ring according to claim 1, wherein the axial dimension of the contact surface is constant in a first region and increases on both sides of the ring end gap over a second region which extends over 5% to 35% of a total circumference of the piston ring.

11. The piston ring according to claim 1, wherein the axial dimension of the contact surface is constant in at least one region in the circumferential direction.

12. The piston ring according to claim 1, wherein an angle between the pressure relief chamfer and the upper edge lies in the range from 93° to 160°.

13. The piston according to claim 5, wherein the minimum valve lies in the range of 5 to 15% of the piston ring height.

14. The piston according to claim 6, wherein the region is over 10 to 30%.

15. The piston according to claim 6, wherein the region is over 10 to 25%.

16. The piston according to claim 12, wherein the angle lies in the range of 100° to 150°.

17. The piston according to claim 12, wherein the angle lies in the range of 105° to 140°.

* * * * *